United States Patent
Meeker et al.

(10) Patent No.: US 9,347,793 B2
(45) Date of Patent: May 24, 2016

(54) SYNTHETIC VISION SYSTEMS AND METHODS FOR DISPLAYING DETACHED OBJECTS

(75) Inventors: John Meeker, Albuquerque, NM (US); John Cunningham, Albuquerque, NM (US); David Baughman, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 990 days.

(21) Appl. No.: 13/437,470

(22) Filed: Apr. 2, 2012

(65) Prior Publication Data

US 2013/0257852 A1    Oct. 3, 2013

(51) Int. Cl.
| | |
|---|---|
| *G06T 15/00* | (2011.01) |
| *G06T 17/00* | (2006.01) |
| *G01C 23/00* | (2006.01) |
| *G01C 21/36* | (2006.01) |
| *G06T 15/08* | (2011.01) |
| *G06T 17/05* | (2011.01) |
| *G06T 19/00* | (2011.01) |

(52) U.S. Cl.
CPC ............ *G01C 23/00* (2013.01); *G01C 21/3638* (2013.01); *G06T 15/00* (2013.01); *G06T 15/08* (2013.01); *G06T 17/00* (2013.01); *G06T 17/05* (2013.01); *G06T 19/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,465,142 | A * | 11/1995 | Krumes et al. | 356/5.01 |
| 5,659,671 | A * | 8/1997 | Tannenbaum et al. | 345/426 |
| 5,684,935 | A * | 11/1997 | Demesa et al. | 345/419 |
| 5,831,570 | A * | 11/1998 | Ammar | F41G 7/2226 342/149 |
| 6,747,576 | B2 * | 6/2004 | Schaefer | 340/945 |
| 6,909,381 | B2 | 6/2005 | Kahn | |

(Continued)

FOREIGN PATENT DOCUMENTS

| | | | | |
|---|---|---|---|---|
| EP | 2228626 A2 | 9/2010 | | |
| EP | 2244239 A2 * | 10/2010 | | G01C 23/00 |
| EP | 2565668 A1 | 3/2013 | | |

OTHER PUBLICATIONS

Gebhardt, et al., "Polygons, point clouds, and voxels, a comparison of high-fidelity terrain representations," Simulation Interoperability Workshop and Special Workshop on Reuse of Environmental Data for Simulation-Processes, Standards, and Lessons Learned, Nov. 2009.*

(Continued)

*Primary Examiner* — Barry Drennan
*Assistant Examiner* — Roberta D Prendergast
(74) *Attorney, Agent, or Firm* — Ingrassia Fisher & Lorenz, P.C.

(57) ABSTRACT

A display system is provided for a vehicle. The display system includes a data source configured to provide terrain data with detached objects that are detached from ground terrain and attached objects that are attached to ground terrain; a processing unit coupled to the data source configured to receive the terrain data and to distinguish the detached objects from the attached objects to generate display commands for a three-dimensional view that comprises graphical elements representing both the detached objects and the attached objects; and a display device coupled to the processing unit and configured to receive the display commands and operable to render the common three-dimensional view to thereby allow viewing of the detached objects and the attached objects.

14 Claims, 4 Drawing Sheets

(56) References Cited

U.S. PATENT DOCUMENTS

| | | | |
|---|---|---|---|
| 7,397,548 B2* | 7/2008 | Filias | G01S 17/933 356/139.03 |
| 7,737,965 B2 | 6/2010 | Alter et al. | |
| 8,244,455 B2* | 8/2012 | Case et al. | 701/417 |
| 8,396,293 B1* | 3/2013 | Korah | G06K 9/0063 382/170 |
| 8,620,089 B1* | 12/2013 | Korah | G06T 7/0081 345/419 |
| 2003/0222887 A1* | 12/2003 | Wilkins et al. | 345/618 |
| 2004/0021662 A1* | 2/2004 | Taubin | 345/419 |
| 2004/0178943 A1* | 9/2004 | Niv | G01S 13/50 342/29 |
| 2005/0243323 A1* | 11/2005 | Hsu et al. | 356/450 |
| 2006/0012599 A1* | 1/2006 | Blask | G01S 7/003 345/424 |
| 2006/0066459 A1 | 3/2006 | Burch et al. | |
| 2006/0125680 A1* | 6/2006 | Thackray | 342/54 |
| 2007/0085705 A1* | 4/2007 | He et al. | 340/967 |
| 2008/0198157 A1* | 8/2008 | Feyereisen et al. | 345/419 |
| 2009/0040070 A1* | 2/2009 | Alter et al. | 340/945 |
| 2009/0076665 A1* | 3/2009 | Hoisington et al. | 701/2 |
| 2009/0185741 A1* | 7/2009 | Nahari et al. | 382/154 |
| 2010/0113149 A1* | 5/2010 | Suddreth et al. | 463/31 |
| 2010/0117867 A1* | 5/2010 | He | 340/974 |
| 2010/0250030 A1 | 9/2010 | Nichols et al. | |
| 2011/0202510 A1* | 8/2011 | Salemann | 707/693 |

OTHER PUBLICATIONS

Himmelsbach, Michael, et al., "LIDAR-based 3D object perception," Proceedings of 1st international workshop on cognition for technical systems, vol. 1, Oct. 2008.*

Himmelsbach, M.; v Hundelshausen, F.; Wuensche, H., "Fast segmentation of 3D point clouds for ground vehicles," 2010 IEEE Intelligent Vehicles Symposium (IV), pp. 560-565, Jun. 21-24, 2010.*

Chilton, R., Crane, C., & Cho, K., Oct. 2010, "Analysis of data structures used for storing and processing 3D LADAR data," 2010 International Conference on Control Automation and Systems (ICCAS), (pp. 1496-1501), IEEE.*

Csébfalvi B & Szirmay-Kalos, S. K., (Oct. 2003), "Monte carlo volume rendering," Proceedings of the 14th IEEE Visualization 2003, (VIS'03), pp. 449-456, IEEE Computer Society.*

Gong, J.; Caldas, C.; "Data processing for real-time construction site spatial modeling," vol. 17, Issue 5, Jul. 2008, pp. 526-535.*

Kim, Eunyoung, and Medioni,Gerard, "Urban scene understanding from aerial and ground LIDAR data," Machine Vision and Applications, published online: Jul. 16, 2010.*

Christian Pschierer; Jens Schiefele; Juerg Luthy; "High-integrity databases for helicopter operations", Proceedings of SPIE 7328, Enhanced and Synthetic Vision 2009, 73280D, (May 6, 2009).*

Teizer, Jochen, "3D range imaging camera sensing for active safety in construction," Electronic Journal Information Technology Construction, vol. 13, (2008), pp. 103-117.*

Triebel, R., Pfaff, P., & Burgard, W., (Oct. 2006), "Multi-level surface maps for outdoor terrain mapping and loop closing," 2006 IEEE/RSJ International Conference on Intelligent Robots and Systems, pp. 2276-2282, IEEE.*

Vandapel, et al., Apr. 2004, "Natural terrain classification using 3-d ladar data," Proceedings 2004 IEEE International Conference on Robotics and Automation, ICRA'04, vol. 5, pp. 5117-5122, IEEE.*

Stephen D. Peterson, Magnus Axholt, and Stephen R. Ellis. 2008. Label segregation by remapping stereoscopic depth in far-field augmented reality. In Proceedings of the 7th IEEE/ACM International Symposium on Mixed and Augmented Reality (ISMAR '08). IEEE Computer Society, Washington, DC, USA, 143-152.*

EP Search Report for Application No. 13159648.8-1557/2647960 dated Jul. 1, 2016.

EP Examination Report for Application No. 13159648.8-1557 Dated Feb. 12, 2016.

* cited by examiner

SYNTHETIC VISION SYSTEMS AND METHODS FOR DISPLAYING DETACHED OBJECTS

TECHNICAL FIELD

The present invention generally relates to aircraft display systems and methods and, more particularly, to synthetic vision systems and methods that display images representing terrain data with detached objects.

BACKGROUND

Computer generated aircraft displays have become highly sophisticated and capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to flight crews. For example, the Primary Flight Display can combine critical flight instrumentation (e.g., altitude, attitude, heading, airspeed, vertical speed instruments) and primary engine instrument indicators into a single, readily interpretable display.

Some Primary Flight Displays may provide a 3D, synthetic perspective view of the terrain surrounding the aircraft, including man-made and natural terrain. Examples include Synthetic Vision Systems (SVSs). These images are typically based on pre-loaded and predetermined terrain data from a database or real-time terrain data from a sensor system. Storing and processing large amounts of this terrain data may be difficult, especially at a level of detail desired for a synthetic display. At times, the terrain data may include detached objects such as power lines or bridges, and detached objects, such as buildings. However, conventional systems and methods may have trouble distinguishing and displaying detached objects relative to attached objects as real-time display images.

Accordingly, it is desirable to provide systems and methods with improved rendering of terrain data on a visual display, such as, for example, a Primary Flight Display, similar electronic aircraft displays, and other types of electronic displays. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for a vehicle is provided. The display system includes a data source configured to provide terrain data with detached objects that are detached from ground terrain and attached objects that are attached to ground terrain; a processing unit coupled to the data source configured to receive the terrain data and to distinguish the detached objects from the attached objects to generate display commands for a three-dimensional view that comprises graphical elements representing both the detached objects and the attached objects; and a display device coupled to the processing unit and configured to receive the display commands and operable to render the common three-dimensional view to thereby allow viewing of the detached objects and the attached objects.

In accordance with another exemplary embodiment, a method is provided for displaying terrain data. The method includes receiving terrain data from a data source; generating a collection of points in a point cloud of a three-dimensional field of view (FOV); identifying detached objects in the point cloud; generating display commands corresponding to the three-dimensional field of view (FOV) with the detached objects; and displaying the detached objects within the three-dimensional FOV on a display device.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide synthetic vision systems and methods for aircraft. More specifically, the synthetic vision systems and methods display images of terrain data representing detached and attached objects relative to ground terrain. The systems and methods identify, distinguish, and/or emphasize the detached objects.

Figure 1:
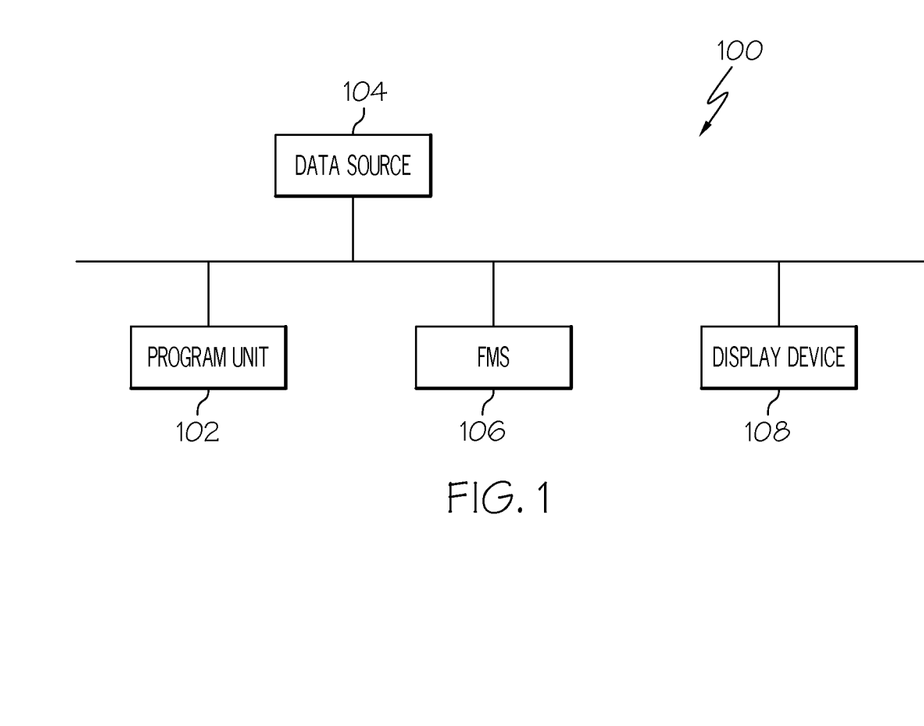
FIG. 1 is a functional block diagram of an aircraft display system in accordance with an exemplary embodiment.

FIG. 1 depicts a block diagram of an exemplary aircraft visual display system 100 for displaying images of terrain surrounding the aircraft. In the exemplary embodiment shown, the system 100 includes a processing unit 102, a data source 104, a flight management system 106, and a display device 108. Although the system 100 appears in FIG. 1 to be arranged as an integrated system, the system 100 is not so limited and can also include an arrangement whereby one or more of the processing unit 102, the data source 104, the flight management system 106, and the display device 108 are separate components or subcomponents of another system located either onboard or external to an aircraft. Also, for example, the system 100 can be arranged as an integrated system (e.g., aircraft display system, Primary Flight Display system, a Head Up Display with SVS or EVS as an overlay (or underlay), a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, fixed wing and rotor aircraft, such as helicopters, as well as other types of vehicles. For simplicity, embodiments are described below with reference to "aircraft."

The processing unit 102 can be a computer processor associated with a Primary Flight Display. Generally, the processing unit 102 receives and/or retrieves flight management information (e.g., from the flight management system 106) and landing, target and/or terrain information (e.g., from data source 104). The processing unit 102 generates display control signals for flight management information, which includes navigation and control symbology such as a zero pitch reference line, heading indicators, tapes for airspeed and altitude, flight path information, RNP information, and any other information desired by a flight crew. As discussed in further detail below, the processing unit 102 additionally receives terrain data from the data source 104 and generates display control signals based on the terrain data. The processing unit 102 then sends the generated display control signals to a display device (e.g., the display device 108). More specific functions of the processing unit 102 will be discussed below.

The data source 104 is coupled to the processing unit 102 and may be any suitable type of data source. The data source 104 may include one or more types of data sources. In general, the data source 104 stores terrain data that includes the locations and elevations of natural and man-made terrain at locations in which the aircraft is operating. In the description below, the terrain data is generally considered to represent at least two types of items in the physical environment surrounding the aircraft: detached objects and attached objects. Attached objects include portions of natural and man-made terrain that are anchored to the ground, and detached objects include portions of natural or man-made terrain that are not attached to the ground. For example, a bridge would include pillars that are considered attached objects and spans between pillars that are considered detached objects. Other examples of detached objects include telephone or power lines, structural overhangs, cables, tree canopies, and the like.

The terrain data may be stored, for example, according to latitude and longitude coordinates. The terrain data further includes regularly spaced elevation values, not necessarily geometrically or linearly spaced but often regularly spaced in degree space. For example, in one exemplary embodiment, terrain data may include elevation or height field values with post spacings of 3 to 6 arc seconds (90 to 185 meters, respectively) to about 1 meter or less (for example, BuckEye data).

In one exemplary embodiment, the data source 104 may be a database with stored data. Such a database may be a memory device (e.g., non-volatile memory, disk, drive, tape, optical storage device, mass storage device, etc.) that can store digital landing, waypoint, and target location as either absolute coordinate data or as a function of an aircraft's position. As noted above, the database can additionally include other types of navigation information, such as information used to calculate flight path and determine RNP information.

Additionally, the data source 104 may include any suitable sensor for detecting terrain and providing data to the processing unit 102 based on the detected terrain. Such a sensor system may include radar or Light Detection and Ranging (LiDAR). Other types of ranging sensors may include types such as acoustic arrays, interferometric synthetic aperture radar (SAR), and the like. In one embodiment, the sensor system is a stand-alone system, although in other embodiments, the sensor system may be used to completely or partially verify a database. The sensor collected data, after additional verifications, may be later inserted into such databases for future uses.

As one example, the data source 104 is populated with data from a Light Detection and Ranging (LiDAR) system. A LiDAR system includes a laser sensor mounted on the underside of the aircraft that transmits pulses of laser beam towards the earth. A receiver affixed to the aircraft receives reflections of the pulses as they bounce off objects and back to the aircraft. From this data, the 3-D positions of terrain and other objects may be determined.

The flight management system 106 is coupled to processing unit 102, and may provide navigation data associated with the aircraft's current position and flight direction (e.g., heading, course, track, etc.) to the processing unit 102. The navigation data provided to the processing unit 102 may also include information about the aircraft's airspeed, altitude, pitch, and other important flight information. In exemplary embodiments, the flight management system 106 may include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., airspeed, altitude, attitude, etc.). Such information can be provided to the processing unit 102 by, for example, an Inertial Reference System (IRS), Air-data Heading Reference System (AHRS), and/or a global positioning system (GPS). As an example, the terrain data collected by a LiDAR system of the data source 104 may be correlated with aircraft position information from the GPS and IRS to fix the position of the terrain data as absolute and relative coordinates.

The system 100 also includes the display device 108 coupled to the processing unit 102. The display device 108 may include any device or apparatus suitable for displaying various types of computer generated symbols and information representing for example pitch, heading, flight path, airspeed, altitude, landing information, waypoints, targets, obstacle, terrain, and RNP data in an integrated, multi-color or monochrome form. Using data retrieved (or received) from the flight management system 106 and/or data source 104, the processing unit 102 executes one or more algorithms (e.g., implemented in software) for determining the position of the various types of desired information on the display device 108. The processing unit 102 then generates display control signals representing this data, and sends display control signals to the display device 108. The display device 108 and/or processing unit 102 may include a graphics display generator for generating the appropriate graphical elements on the screen of the display device 108, as discussed in greater detail below. In this embodiment, the display device 108 is an aircraft cockpit display (e.g., a Primary Flight Display). In other embodiments, the aircraft is an unmanned vehicle and the display device 108 is located in a control facility.

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
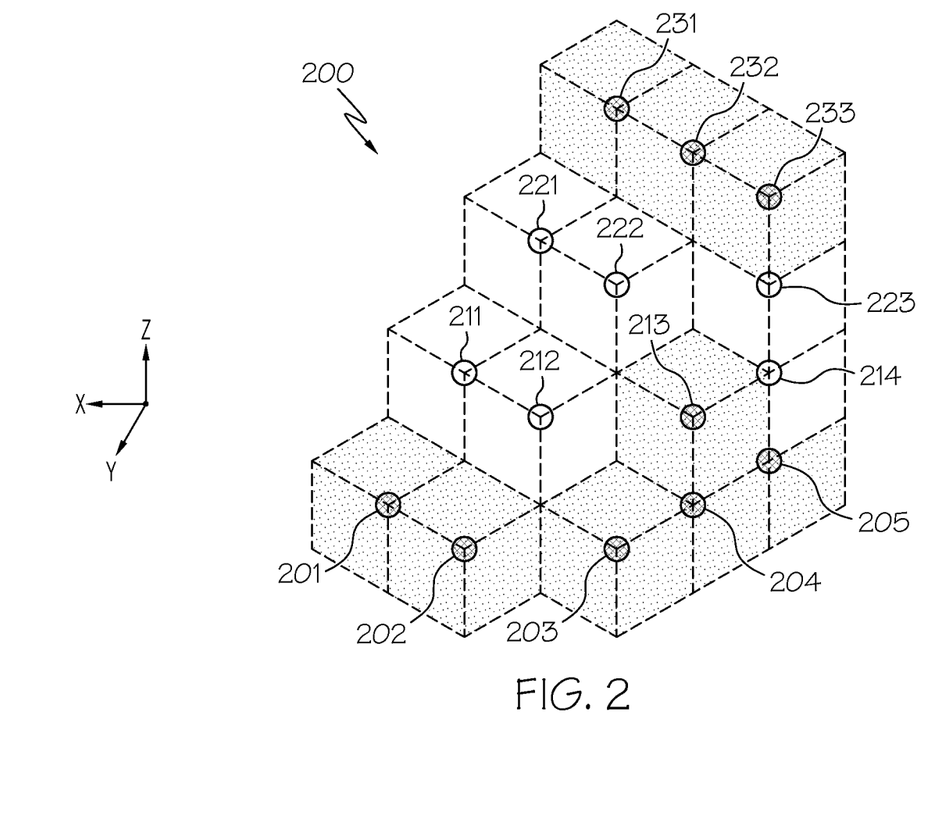
FIG. 2 is a schematic representation of terrain information for generating a visual display in accordance with an exemplary embodiment.

FIG. 2 is a schematic representation of a terrain information (or "sensed terrain") 200. The schematic representation of the terrain information 200 of FIG. 2 will be described briefly prior to a more detailed description of a method 300 (FIG. 3) for rendering a visual display 400 (FIG. 4). In one exemplary embodiment, the terrain information 200 is generated from terrain data in the form of a field of view (FOV) mesh or point cloud, which is a collection of points that collectively form the terrain, including obstacles, and other flight information displayed on the display device 108. In the schematic representation of the terrain information 200, a number of points 201-205, 211-214, 221-223, and 231-233 are illustrated. In practice, points form a 3D FOV for a user, although in FIG. 2, some of the points have been removed for clarity in the discussion below. Typically, a point is an element representing a value on a grid or in a cloud in a three-dimensional space. Although the terrain data is discussed as points in a point cloud, in other embodiments, the data may be provided as voxels, which are volumetric pixels or volume elements each representing a value on a grid in three-dimensional space. In some embodiments, such as one discussed below, the data is received as voxelized data and reduced to point data prior to rendering into the terrain information 200. In the view of FIG. 2, a voxelized representation of the terrain information 200 is shown in dashed lines, which also indicate the grid structure of the terrain information 200. Typically, each point may be represented by a voxel, as shown. In the description below, the points are described as being processed, although in other embodiments, voxelized data may be received and processed into the visual display or converted into corresponding point data and processed into the visual display.

As shown, each point 201-205, 211-214, 221-223, and 231-233 has a three-dimensional address (e.g., xyz coordinates) that corresponds to the synthetic view rendered as the sensed terrain. In the representation of FIG. 2, points 201-205 corresponding to a 2D, generally flat surface lying in the xy plane. The other points 211-214, 221-223, and 231-233 corresponds to points elevated from the xy-plane in a z-direction. As such, in practice, the xy-plane points 201-205 may represent terrain with a constant relative elevation of zero (0) (e.g., the "ground"), while the other points 211-214, 221-223, and 231-233 represent areas of the sensed terrain of the terrain information 200 with elevations above the ground.

Points 201-205 represent a portion of the ground of the terrain and point 213 represents an elevated portion of terrain, such as hill or building, that extends above the ground. As shown, point 213 is contiguous with point 204, thereby representing that the elevated portion of terrain, represented by point 213, is attached to the ground, represented by point 204. In contrast, points 231-233 are not contiguous with the points 201-205, thereby representing that the terrain or objects corresponding to points 231-233 are detached relative to the ground. The gap represented by 214 and 223 do not contain any object, thereby representing that there is space or air between the objects located in points 231-233 and objects located in points 201-205. In contrast to prior art, the terrain information 200 accurately represents the detachment of the object in the location represented by points 231-233 by having a gap that exceeds a defined threshold between sensed points (e.g., the space represented by 214 and 223).

In one exemplary embodiment, the points that are occupied (e.g., points 201-205, 213, and 231-233) with sensed terrain are represented as active pixels on the resulting visual display. In other embodiments, the highest points for continuous elevated portions of sensed terrain (e.g., point 213) are identified such that a transition between the elevated point and the ground may be constructed. In either embodiment, as noted above, the noncontiguous elevated portions that meet the defined thresholds are identified as detached terrain for appropriate rendering on the visual display in any suitable manner.

Additional details about the terrain information 200 will be described with reference to the method 300 of FIG. 3, which describes a method for rendering the terrain information 200 of FIG. 2 with the system 100 of FIG. 1. As such, the method 300 of FIG. 3 will be described with reference to the system 100 of FIG. 1 and with reference the schematic representation of the sensed terrain of the terrain information 200 of FIG. 2. In one embodiment, the method 300 is used for displaying terrain data in 3D, synthetic view for a Primary Flight Display of an aircraft. As also described in greater detail below, the system 100 and/or method 300 may produce a visual display, such as the visual display 400 of FIG. 4.

Figure 3:
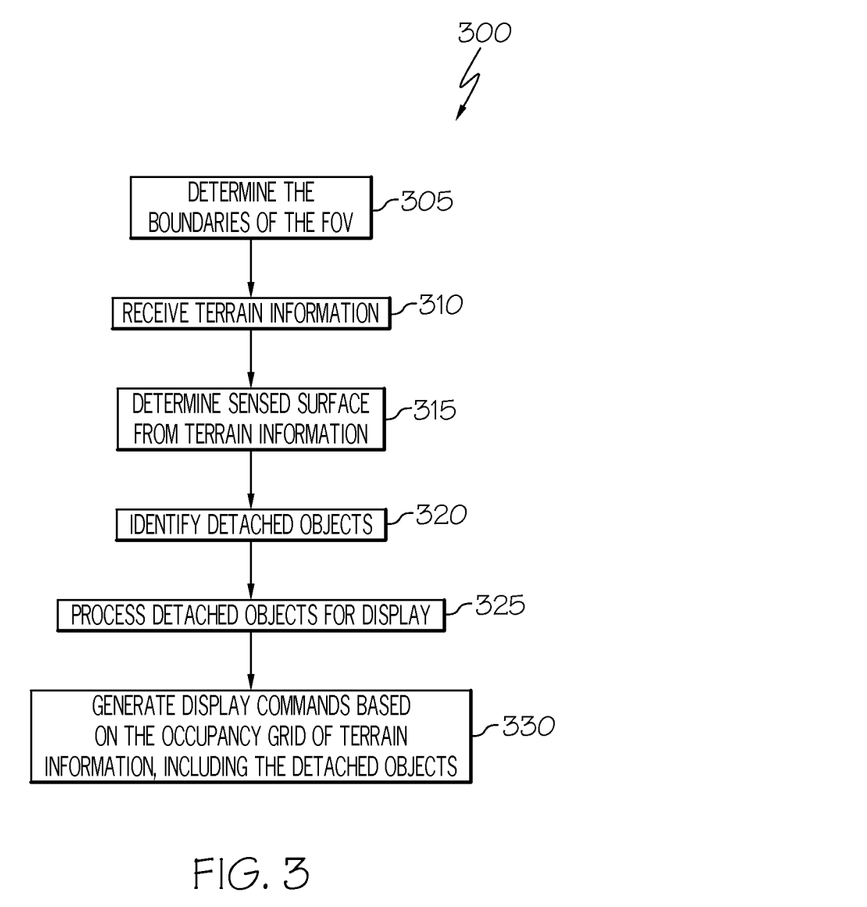
FIG. 3 is a flowchart describing a method for displaying images representing terrain data with detached and attached objects in accordance with an exemplary embodiment.
Figure 4:
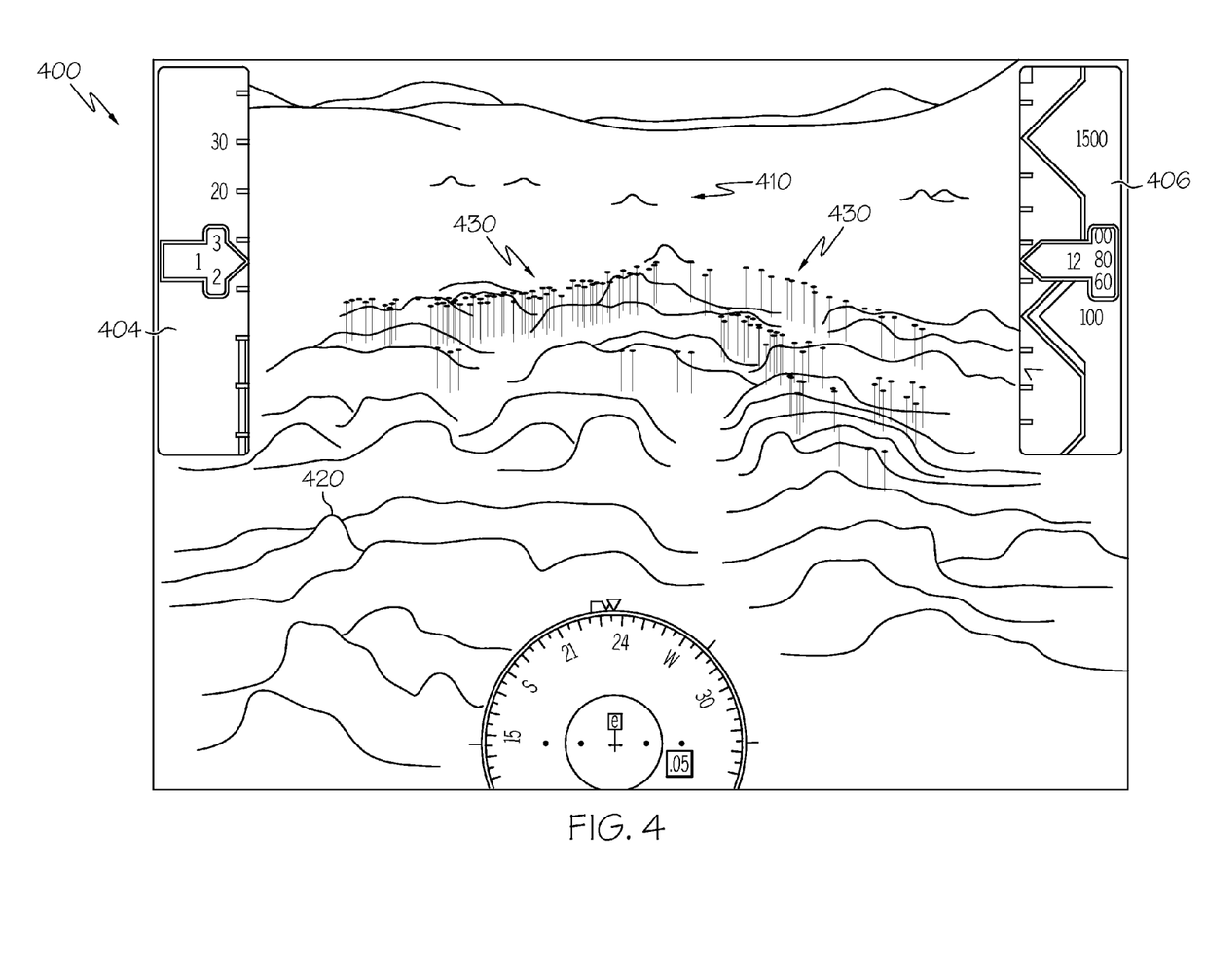
FIG. 4 depicts an exemplary image of the visual display generated by the aircraft display system of FIG. 1 in accordance with an exemplary embodiment.

In a first step 305 of the method 300 of FIG. 3, the processing unit 102 determines the boundaries of the FOV, e.g., the terrain and other objects that the pilot or operator is to view from the aircraft. As described above, in a Primary Flight Display, the FOV is the synthetic terrain that surrounds the aircraft as viewed from the cockpit or other vantage point. The boundaries of the FOV may be expressed as latitude/longitude data and transformed into a "real-world" coordinate system relative to the aircraft or an xyz-coordinate system of the display device 108.

In a second step 310, the processing unit 102 receives terrain information corresponding to the FOV. In one exemplary embodiment, the terrain information may be in the form of point data or voxelized data, such as that shown in FIG. 2 and referenced below. As noted above, voxelized data may be received by the processing unit 102 and processed into point data for subsequent steps. In general, the terrain information 200 has a 3D grid structure, as described above.

In a third step 315, the processing unit 102 determines sensed surfaces from the data source 104. As described above, the terrain data may be stored according to latitude/longitude/elevation and transformed according to the FOV and be represented in the mesh as a collection of points. In the example of FIG. 2, the sensed terrain would include the points 201-205, 211-214, 221-223, and 231-233.

In one exemplary embodiment, data from the data source 104 (also referenced as "return data") is analyzed to determine the position in 3D space that generated the return. This data is used to update the occupancy state of the voxels (or points e.g., points 201-205, 211-214, 221-223, and 231-233) within the occupancy grid in a probabilistic manner (e.g., by increasing or decreasing the probability that a particular point, or group of points, are occupied). Likewise, the lack of return data from a particular position in space is also used to update the state of the points within the occupancy grid (for example, in this case, by lowering the probability of occupancy for the appropriate points). Determination that a point is occupied or unoccupied is performed by applying a binary threshold to the accumulated probabilities.

In step 320, the processing unit 102 identifies the objects, represented as points, that are detached from the underlying terrain. This step may be accomplished in any number of ways. For example, starting from the "base" or bottom level of points in the grid and working upwards, each column of voxels in the occupancy grid may be examined to determine the lowest group of continuous occupied points and noting the highest point within this column set. The column associated with the underlying occupied point is further analyzed to determine if additional points are occupied. If so, the unoccupied points between the underlying continuous occupied points and the additional occupied points are evaluated. If the unoccupied points are less than a predetermined threshold, the additional occupied points are deemed contiguous with the underlying occupied points as a single structure. However, if the unoccupied points exceed the predetermined threshold, the additional occupied points are deemed a detached object in which the lowest point in this group defines the lowest point of the detached object and the highest point defines the upper boundary. The column is further analyzed to determine if additional points are occupied. If additional occupied points are detected, the vertical extent of a previously discovered detached object may be extended or new detached objects may be defined, depending on the size of the gaps separating each group of points, e.g., if the gaps between sets of points are sufficiently small, the next higher set of points is added to the previously discovered set of points, otherwise a new set of points is defined as a new detached object in a vertical column.

As such, in one exemplary embodiment, the detached objects are identified by discontinuities between activated and deactivated points that are greater by a threshold distance or some number of points. In other words, a constant column of activated voxels represents an attached object, and an elevated activated voxel or collection of voxels unconnected to the base level of voxels represents an unattached object. The threshold determining a detached object may be any suitable threshold, depending on the resolution and accuracy of the sensor. In one exemplary embodiment, the threshold may be, for example, 1 foot to 20 feet, or about 5 feet.

In step 325, the processing unit 102 identifies detached objects separately from the surface comprised of terrain and objects attached to the terrain (e.g., structures, vehicles, etc.) to be rendered on the display device 108 or provided for additional processing (e.g., autonomous flight control system). When used for display, the display commands may include symbology that displays the detached object as being detached from the underlying terrain. Additional symbology may emphasize or identify the detached object, such as by changing the relative size, geometry, shading, shadowing, or color of the detached object or by tethering the detached object to the appropriate location in the xy-plane.

In step 330, the processing unit 102 may generate display commands for rendering the terrain information on the display device 108. Typically, any suitable approach may be provided to render the terrain information (e.g., as properly group within the vertical columns of the 3D grid and evaluated for detached objects) in a visual display. In one exemplary embodiment, the grid structure information such that the highest point of each lowest group of points within each vertical column may define a base surface that may be rendered by generating a polygonal mesh connection. Such a polygonal mesh may be draped with a texture generated with coloration derived from the relative elevations of mesh points, satellite imagery, and the like. Alternatively, the column of points defining this lowest group of points may be rendered as individual points rather than constructing a solid surface (e.g., if sufficient point density is provided), and texture draping may not be necessary. The detached objects may be rendered with different primitives and with different primary colors. For example, the detached objects may be rendered as individual points. e.g., each of the point groups representing a detached object in a vertical column may be rendered as an individual point. As another example, each group of points within a column may be collapsed into a single primitive such as a 3D box representing the column of points associated with the detached object.

A more detailed example of a visual display is shown in FIG. 4, discussed below. The method 300 is repeated for each processing cycle of the system 100 to produce a continuously changing FOV image for the pilot.

An exemplary visual display 400 is shown in FIG. 4. The visual display 400 is an exemplary visual display that may be rendered, for example, by the aircraft display system 100 of FIG. 1 and the method 300 of FIG. 3.

The visual display 400 shows, among other things, computer generated symbols and graphical elements representing an airspeed scale or tape 404, an altitude scale or tape 406, and terrain (e.g., identified generally as element 410). Other types of navigation and control symbology or graphical elements, such as a zero-pitch reference line, landing point, and the like may be provided, as necessary or desired. Although the visual display 400 is shown as an egocentric, first-person frame of reference, the visual display 400 can be a secondary, wingman, exocentric, and/or plan or perspective view that enables a viewer to view the aircraft, as well as zoom in and out, including an unmanned vehicle and/or spacecraft. Although the visual display 400 is generally associated with a Primary Flight Display, the display can also be utilized on a multifunction display, Head Up Display, and/or a head mounted display.

In this embodiment, the terrain 410 is rendered as a three-dimensional, perspective view. The terrain 410 can include any representation of the environment surrounding the aircraft, including flattened terrain. Additionally, the terrain 410 can include a virtual plane selected by a pilot at certain elevation relative to the aircraft and is rendered at that elevation.

In addition, and as will now be described in more detail, the visual display 400 may selectively render symbology forming part of the terrain 410 as shown in FIG. 4, the terrain 410 may include attached objects 420, such as hills and buildings, and detached objects 430, such as power lines. In the example of FIG. 4, the detached objects 430 are emphasized by enlarging the scale of the detached terrain and/or by changing the color of the detached terrain. Additionally, the detached objects 430 may include a tether that provides an indication of the location of the respective detached object 430 relative to the underlying terrain. In particular, the detached objects 430 may be represented by a readily-identifiable "dot" hovering over the underlying attached object 420. In other words, the dot may represent the highest point of a noncontiguous, occupied point or collection of points. The area between a particular detached object 430 and a corresponding attached object 420 is generally shown as "air" or empty space to provide a realistic representation. Conventional synthetic vision systems typically consider only the voxel with the highest elevation and activate all underlying voxels, thereby rendering all objects as being attached to the ground. Conventional systems with a series of such objects (e.g., representing a power line) will often result in the display of a "sheet" from objects to ground, which is inaccurate and obscures terrain behind the sheet.

Accordingly, synthetic vision systems and methods for displaying attached and detached objects of terrain are provided. In particular, the systems and methods extract and process geometrical sensor data in a 3D voxelized or point cloud space in real-time to identify detached objects for accurately rendering the environment of the user. Such a display provides increased situational awareness while enabling efficient processing and storage of terrain data. Although the embodiments discussed above relate to provide a visual display for a vehicle display, either in a cockpit or control center, exemplary embodiments are also applicable for determining detached objects with respect to other non-display functions, such as navigation or mapping.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a vehicle, comprising:
a data source configured to provide terrain data with detached objects that are detached from ground terrain and attached objects that are attached to ground terrain, the detached objects including a first detached object within a first column of grid points of a three-dimensional occupancy grid based on the terrain data;
a processing unit coupled to the data source configured to receive the terrain data and to distinguish the detached objects from the attached objects to generate display commands for a three-dimensional view that comprises graphical elements representing both the detached objects and the attached objects, the processing unit configured to identify the first detached object when a discontinuity between a lowest group of continuously occupied points from a bottom-most level of the first column and additional occupied points within the first column exceeds a predetermined threshold; and
a display device coupled to the processing unit and configured to receive the display commands and operable to render the common three-dimensional view to thereby allow viewing of the detached objects and the attached objects,
wherein the processing unit is further configured to generate the display commands with a first tether extending from the first detached object to a corresponding terrain location within the first column.

2. The display system of claim 1 wherein the processing unit is further configured to extract the detached objects from the three-dimensional occupancy grid.

3. The display system of claim 1, wherein the processing unit is further configured to modify an appearance of the detached objects relative to the attached objects.

4. The display system of claim 3, wherein the processing unit is further configured to modify the appearance of the detached objects by modifying at least one of relative size, color, and shading.

5. The display system of claim 1, wherein the data source is a sensor.

6. The display system of claim 1, wherein the display device is a Primary Flight Display (PFD).

7. The display system of claim 1, wherein the display device is a Multi-Function Display (MFD).

8. The display system of claim 1, wherein the data source is a sensor with a resolution, and wherein the predetermined threshold corresponds to the resolution of the sensor.

9. A method for displaying terrain data, the method comprising:
receiving terrain data as a collection of voxels in an occupancy grid from at least one sensor with a resolution;
generating a collection of points in a point cloud of a three-dimensional field of view (FOV) from the collection of voxels, the point cloud including a bottom level of grid points with a column of grid points extending from each of the bottom level of grid points;
identifying detached objects in the point cloud, the identifying including identifying a first detached object of the detached objects within a first column of grid points by
identifying, for the first column, a lowest group of continuous occupied points extending from the bottom level as a first column set, each of the first column set having a highest point,
identifying, for the first column, additional occupied points outside of the first column set, including a first lowest grid point of the additional occupied points for the first column,
determining, for the first column, a distance between the first lowest grid point of the additional occupied points and the highest point of the lowest group of continuous occupied points, and
identifying, for the first column, the additional occupied points as one of the detached objects when the distance exceeds a predetermined threshold, the predetermined threshold corresponding to the resolution of the at least one sensor;
generating display commands corresponding to the three-dimensional field of view (FOV) with the detached objects; and
displaying the first detached object within the three-dimensional FOV on a display device with a first tether extending from the first detached object to a corresponding terrain location within the first column.

10. The method of claim 9, further comprising modifying an appearance of the detached objects relative to attached objects in the point cloud.

11. The method of claim 10, wherein the modifying step includes modifying at least one of relative size, color, and shading.

12. The method of claim 9, wherein the displaying step includes displaying the three-dimensional FOV on a Primary Flight Display (PFD).

13. The method of claim 9, wherein the displaying step includes displaying the three-dimensional FOV on a Multi-Function Display (MFD).

14. The method of claim 9, wherein the receiving step includes receiving the terrain data from a LiDAR system.

* * * * *